US012374472B2

(12) United States Patent
Hengstler et al.

(10) Patent No.: US 12,374,472 B2
(45) Date of Patent: Jul. 29, 2025

(54) METHOD FOR RE-ESTABLISHING AN ELECTRICAL APPARATUS OF MEDIUM OR HIGH VOLTAGE

(71) Applicant: Hitachi Energy Ltd, Zürich (CH)

(72) Inventors: Johannes Hengstler, Zürich (CH); Saskia Buffoni, Lenzburg (CH); Ulrich Straumann, Winterthur (CH); Manuel Naef, Rapperswil-Jona (CH); Loic Fave, Fribourg (CH)

(73) Assignee: Hitachi Energy Ltd, Zürich (CH)

( * ) Notice: Subject to any disclaimer, the term of this patent is extended or adjusted under 35 U.S.C. 154(b) by 124 days.

(21) Appl. No.: 18/023,438

(22) PCT Filed: Sep. 8, 2021

(86) PCT No.: PCT/EP2021/074454

§ 371 (c)(1),
(2) Date: Feb. 27, 2023

(87) PCT Pub. No.: WO2022/073704

PCT Pub. Date: Apr. 14, 2022

(65) Prior Publication Data

US 2023/0317320 A1 Oct. 5, 2023

(30) Foreign Application Priority Data

Oct. 9, 2020 (EP) .................................... 20201068

(51) Int. Cl.
*H01B 13/06* (2006.01)
*H01B 3/44* (2006.01)

(52) U.S. Cl.
CPC ............... *H01B 13/06* (2013.01); *H01B 3/44* (2013.01)

(58) Field of Classification Search
CPC . H01B 17/36; H01B 3/56; H01B 3/16; H01B 3/44
See application file for complete search history.

(56) References Cited

U.S. PATENT DOCUMENTS

| | | | |
|---|---|---|---|
| 5,388,451 A | 2/1995 | Stendin et al. | |
| 9,257,213 B2 * | 2/2016 | Ingold | H01B 3/56 |
| 9,899,167 B2 * | 2/2018 | Florez | H01H 33/7015 |
| 2011/0127237 A1 | 6/2011 | Uchii et al. | |
| 2013/0277334 A1 | 10/2013 | Mantilla et al. | |
| 2018/0358148 A1 | 12/2018 | Kieffel et al. | |
| 2019/0067918 A1 | 2/2019 | Di-Gianni et al. | |
| 2019/0156968 A1 | 5/2019 | Gautschi et al. | |

FOREIGN PATENT DOCUMENTS

| | | | |
|---|---|---|---|
| CN | 102047365 | A | 5/2011 |
| CN | 103415895 | A | 11/2013 |
| CN | 108475555 | A | 8/2018 |
| CN | 108831587 | A | 11/2018 |
| CN | 109074901 | A | 12/2018 |
| DE | 102017220570 | A1 | 5/2019 |
| EP | 2284854 | A1 | 8/2014 |
| EP | 3047491 | B1 | 12/2017 |
| EP | 2834818 | B1 | 6/2018 |
| EP | 3863136 | A1 | 8/2021 |
| JP | 2014506376 | A | 3/2014 |
| KR | 10-1897266 | B1 | 9/2018 |
| WO | 2009144907 | A1 | 12/2009 |
| WO | 2010142346 | A1 | 12/2010 |
| WO | 2012080246 | A1 | 6/2012 |
| WO | 2013151741 | A1 | 10/2013 |
| WO | 2015040069 | A1 | 3/2015 |
| WO | 2020025326 | A1 | 2/2020 |

OTHER PUBLICATIONS

Extended European Search Report, European Patent Application No. 20201068.2, mailed Apr. 8, 2021, 8 pages.
International Search Report and Written Opinion of the International Searching Authority, PCT/EP2021/074454, mailed Jan. 7, 2022, 11 pages.
Wiener, J., et al., "Dielectric Properties of Fluorine Containing Insulating Gases for Gas Insulated Systems," The 20th International Symposium on High Voltage Engineering, Buenos Aires, Argentina, Aug. 27-Sep. 1, 2017, 6 pages.
Notice of Reasons for Refusal, Japanese Patent Application No. 2023-514935, mailed Apr. 9, 2024, 3 pages.
Search Report, Chinese Patent Application No. 202180054843.8, mailed Jun. 19, 2024, 2 pages.
Korean Office Action and English Translation, Korean Patent Application No. 10-2023-7007763, mailed Dec. 10, 2024.
"Alternative Environmentally Friendly Insulating Gases for SF", Wang, et al., MDPI, processes, Published Apr. 15, 2019, Electric Power Test and Research Institute, Guangzhou Power Supply Co. Ltd, China, 14 pages.

* cited by examiner

*Primary Examiner* — Timothy L Maust
(74) *Attorney, Agent, or Firm* — Sage Patent Group

(57) ABSTRACT

The present invention relates to a method for re-establishing an electrical apparatus of medium or high voltage. The method includes
- providing an electrical apparatus designed for using an insulation medium containing $SF_6$,
- removing $SF_6$ from an insulation space contained in the apparatus and
- filling an alternative insulation medium into the insulation space, wherein the alternative insulation medium is a mixture of at least one organofluorine compound A and a carrier gas containing nitrogen.

20 Claims, No Drawings

METHOD FOR RE-ESTABLISHING AN ELECTRICAL APPARATUS OF MEDIUM OR HIGH VOLTAGE

CROSS REFERENCE TO RELATED APPLICATIONS

This application is a 35 U.S.C. § 371 national stage application of PCT International Application No. PCT/EP2021/074454 filed on Sep. 6, 2021, which in turn claims foreign priority to European Patent Application No. 20201068.2, filed on Oct. 9, 2020, the disclosures and content of which are incorporated by reference herein in their entirety.

BACKGROUND

The present invention relates to a method for re-establishing an electrical apparatus of medium or high voltage. The invention further relates to an electrical apparatus obtainable by the methods described herein.

In electrical apparatuses of the type mentioned above, dielectric insulation media in gaseous or liquid state are conventionally applied for the insulation of an electrically conductive part.

In medium or high voltage metal-encapsulated switchgears, for example, the electrically conductive part is arranged in a gas-tight housing, which defines an insulating space, said insulation space comprising an insulation gas and separating the housing from the electrically conductive part without letting electrical current to pass through the insulation space. For interrupting the current in e.g., high voltage switchgears, the insulating gas further functions as an arc-extinction gas.

Sulphur hexafluoride (SF6) is a well-established insulation gas due to its outstanding dielectric properties and its chemical inertness. Despite these properties, efforts to look for an alternative insulation gas have nevertheless been intensified, in particular in view of a substitute having a lower Global Warming Potential (GWP) than the one of SF6.

In view of providing a non-SF6 substitute, the use of organofluorine compounds in dielectric insulation media has been suggested. Specifically, WO-A-2010/142346 suggests a dielectric insulation medium comprising a fluoroketone containing from 4 to 12 carbon atoms.

Fluoroketones have been shown to have a high dielectric strength. At the same time, they have a very low Global Warming Potential (GWP) and very low toxicity. Owed to the combination of these characteristics, fluoroketones constitute a viable alternative to SF6.

Further developments in this regard are reflected in WO-A-2012/080246 suggesting a dielectric insulation gas comprising a fluoroketone containing exactly 5 carbon atoms, in particular 1,1,1,3,4,4,4-heptafluoro-3-(trifluoromethyl)-butan-2-one, in a mixture with a carrier gas, in particular air or an air component, which together with the fluoroketone provides a non-linear increase of the dielectric strength of the insulation medium over the sum of dielectric strengths of the gas components of the insulation medium.

Further attempts in finding an alternative "non-SF6" insulation medium are reflected in WO 2013/151741 suggesting the use of heptafluoroisobutyronitrile, (CF3)2CFCN, or 2,3,3,3-tetrafluoro-2-(trifluoromethoxy)propanenitrile (CF3CF(OCF3)CN, as a dielectric fluid.

Based thereon, WO 2015/040069 describes an electrical apparatus of medium or high voltage comprising a housing, in which a gaseous medium comprising heptafluoroisobutyronitrile, carbon dioxide and oxygen is contained.

Despite their favourable properties in terms of environmental friendliness, in particular a low GWP, the dielectric strength of the alternative insulation media discussed above is at operating conditions lower than the one of SF6. For at least some of the proposed "non-SF6" substitutes, this is due to their boiling point being relatively high. In order to provide for a sufficient dielectric strength, additional heating means are often required for achieving a sufficiently high gas density of the "non-SF6" substitute.

Moreover, given that the design pressure of a housing or enclosure of an electrical apparatus of medium or high voltage is fixed after production (with the respective indication being stamped in the housing), there is only limited possibility to increase the pressure of the insulation gas for obtaining a higher gas density and ultimately a higher dielectric strength. In addition, a pressure increase is often accompanied by insulation gas leaking out of the apparatus, ultimately leading to the situation that a safe operation of the apparatus cannot be maintained. Specifically, this applies to the well-known gas mixture proposed in WO 2015/040069 containing heptafluoroisobutyronitrile and carbon dioxide, which has been found to permeate through sealing components conventionally employed for apparatuses using SF6, namely sealing components made of EPDM. The safe operation of these apparatuses can neither be maintained, if using binary gas mixtures essentially consisting of heptafluoroisobutyronitrile and carbon dioxide, which are also well-known to the skilled person.

In consideration of the increasing need to reduce the use of SF6 to a minimum, it would be desirable to replace existing SF6-tailored apparatuses by apparatuses of improved environmental friendliness, in particular in view of a reduced GWP. However, for the reasons mentioned above, a replacement of SF6 is currently not possible without compromising the safe operation of the apparatus and/or without requiring substantial changes in the overall design of the apparatus.

The problem to be solved by the present invention is thus to provide a simple method to re-establish an SF6-tailored apparatus in a manner such that it complies with the requirement of improved environmental friendliness, in particular a reduced GWP, but without compromising the safety of the apparatus.

BRIEF SUMMARY

The problem is solved by the method according to claim 1. Some embodiments of the invention are defined in the dependent claims.

According to claim 1, the invention relates to a method for re-establishing an apparatus of medium or high voltage. The electrical apparatus to which the present invention refers can be any kind of apparatus for the generation, the transmission, the distribution and/or the usage of electrical energy. In the context of the present invention, "medium voltage" refers to a voltage level range from 1 kV to 52 kV, whereas "high voltage" refers to a voltage level range higher than 52 kV.

According to claim 1, the method comprises a first step of providing an electrical apparatus designed for using an insulation medium containing SF6, i.e., an apparatus, the components of which as well as their arrangement (including the clearance distance between components) is tailored to the use of SF6. In other words, the method starts from an apparatus using an SF6-containing medium, which is contained in an insulation space of the apparatus and which has the function of an insulation medium and, optionally, also of an arc-extinction medium. Apparatuses of this type are well known to the skilled person. They are gas-tight with regard to SF6 being present in the insulation space of the apparatus. In these apparatuses, insulation spaces containing SF6 are typically sealed using EPDM rubber (ethylene propylene diene monomer rubber) as sealing material. Apparatuses of the type mentioned above further have the ability of dissipating heat efficiently from the electrical components. The SF6-containing medium used in these apparatuses can be SF6 in pure form, but also covers a medium in which apart from SF6 impurities are present. Alternatively, the SF6 containing-medium can also relate to a mixture containing SF6 in combination with e.g., a carrier gas or a further dielectric compound.

The method of the present invention comprises the further steps of removing at least partially the SF6-containing insulation medium from an insulation space contained in the apparatus and filling an alternative insulation medium into the insulation space.

DETAILED DESCRIPTION

It has surprisingly been found that by using a mixture of at least one organofluorine compound A and a carrier gas containing nitrogen, an increased environmental friendliness can be achieved without compromising the safety of the apparatus.

In particular, it has been found that no change in the overall design of the apparatus and in the choice of components and materials used is required.

Specifically, the method of the present invention allows an electrical apparatus to be achieved, which is of a lower GWP compared to an apparatus of the same configuration but using an SF6-containing medium. Thus, the present invention relates to a method for reducing the GWP of the electrical apparatus provided above.

The technical effect achieved by the present invention is particularly pronounced if the organofluorine compound A is selected from the group consisting of fluoroethers, in particular hydrofluoromonoethers, fluoroketones, in particular perfluoroketones, fluoroolefins, in particular hydrofluoroolefins, and fluoronitriles, in particular perfluoronitriles, and mixtures thereof.

According to some embodiments, the organofluorine compound A is a fluoronitrile, and in particular a perfluoronitrile.

More particularly, the fluoronitrile can be a perfluoroalkylnitrile, specifically perfluoroacetonitrile, perfluoropropionitrile (C2F5CN) and/or perfluorobutyronitrile (C3F7CN).

In some embodiments, the fluoronitrile can be perfluoroisobutyronitrile (according to the formula (CF3)2CFCN) and/or perfluoro-2-methoxypropanenitrile (according to the formula CF3CF(OCF3)CN). Of these, perfluoroisobutyronitrile may be advantageous due to its low toxicity.

For the specific alternative insulation medium mentioned above, which—apart from nitrogen—contains heptafluoroisobutyronitrile as the organofluorine compound A, it has been found that at a predetermined total pressure of the gas mixture a partial pressure of the organofluorine compound A can be achieved, which is higher than the partial pressure of the compound achievable in a gas mixture containing carbon dioxide at a total pressure to reach the same dew point or minimal operating temperature. As will be pointed out in further detail below, the use of nitrogen in the fluoronitrile-containing gas mixture allows a Poynting effect to be achieved, which partly compensates the increase in the dew point resulting from the use of heptafluoroisobutyronitrile having a relatively high boiling point. In combination with the relatively high dielectric strength inherent to nitrogen, a dielectric insulation performance similar to the one of SF6 can be achieved by the alternative insulation medium.

In addition, it has been found that the organofluorine compound A, specifically heptafluoroisobutyronitrile, exhibits a high compatibility with other materials contained in the apparatus. In particular with regard to the sealing components typically used in an electrical apparatus using SF6, the permeation rate of the alternative insulation medium has been found to be relatively low. Thus, the dielectric insulation properties present in the insulation space can be maintained over time, which also contributes to the high safety of the apparatus re-established according to the present invention.

Ultimately, a replacement of an electrical apparatus using SF6 by an electrical apparatus of improved environmental friendliness can be achieved, without requiring a change in the overall design of the apparatus and in the choice of components and materials used, as mentioned above. The concept of the present invention is thus in clear distinction from the one disclosed in EP-A-3118955, according to which the design of the apparatus is changed in view of allowing a future switch from SF6 to an eco-efficient insulation gas.

It may be advantageous that after filling an alternative insulation medium into the insulation space, the partial pressure of the organofluorine compound A is at least 5 kPa, in some embodiments at least 10 kPa, in some embodiments at least 15 kPa, and in some embodiments at least 20 kPa.

According to the some embodiments, a carrier gas containing nitrogen is used in the alternative insulation medium according to the present invention. The carrier gas used can essentially consist of nitrogen. Alternatively, the carrier gas can contain at least one further carrier gas component other than nitrogen, in particular in an amount lower than the one of nitrogen. Specifically, the at least one further carrier gas component can be an oxidizing gas for preventing the formation of soot.

According to some embodiments of the present invention, the carrier gas amounts to more than 60%, in some embodiments more than 70%, and in some embodiment more than 80% of the total gas pressure of the alternative insulation medium.

According to some embodiments, the molar percentage of nitrogen in the alternative insulation medium is higher than 50%, in some embodiments higher than 60%, in some embodiments higher than 70% and in some embodiments higher than 80%.

As mentioned above, the carrier gas can further contain an oxidizing gas, in particular oxygen. In this regard, some embodiments provide that the amount of oxidizing agent is lower than the amount of nitrogen, as also mentioned above. In some embodiments the molar percentage of oxidizing gas in the alternative insulation medium is in a range from 1 to 25%, in some embodiments from 2 to 20%, in some embodiments from 3% to 15%, and in some embodiments from 4 to 10%.

According to some embodiments, the amount of carbon dioxide in the alternative insulation medium is lower than the amount of nitrogen. In some embodiments, the molar percentage of carbon dioxide in the alternative insulation medium is lower than 5%, in some embodiments lower than 2%. In some embodiments, the alternative insulation medium is at least approximately devoid of carbon dioxide.

In some embodiments, the molar percentage of the organofluorine compound A contained in the alternative insulation medium is from 0.5% to 35%, in some embodiments from 1% to 30%, and in some embodiments from 1.5% to 25%. Ultimately, a very high dielectric performance can be achieved by using a mixture as defined above as dielectric insulation or arc-extinction medium.

As discussed above, the use of a mixture containing heptafluoroisobutyronitrile and nitrogen has been found to be particularly advantageous. This mixture can be a binary mixture containing exclusively heptafluoroisobutyronitrile and nitrogen. Alternatively, further components, in particular oxygen, can be contained.

As also discussed above, it has been found that in combination with nitrogen, the fluoronitrile-containing alternative insulation medium has a dew point, which is lower than the dew point of the fluoronitrile itself. This can be explained by a substantial Poynting effect achieved for the specific mixture of the fluoronitrile, more specifically heptafluoroisobutyronitrile, with nitrogen. In more concrete terms, dew point measurements of an alternative insulation medium containing heptafluoroisobutyronitrile in mixture with a carrier gas containing nitrogen and oxygen have revealed a dew point of −33° C., which is lower than the dew point of the isolated heptafluoroisobutyronitrile at the same partial pressure as used in the mixture (being at about −30° C.) and substantially lower than the dew point of a ternary mixture as the one defined above but using carbon dioxide instead of nitrogen (being at about −27° C.).

According to some embodiments, the alternative insulation medium contains about 85% of nitrogen, about 10% of heptafluoroisobutyronitrile and about 5% of oxygen, all percentages relating to the molar percentage of the respective component.

As will also be discussed below, the alternative insulation medium of the present invention, in particular of the composition defined above, is favourable in view of a high compatibility with other material, such as sealings, solid insulators and the like, contained in the electrical apparatus in which it is to be used. In particular, the alternative insulation medium is compatible with a sealing material selected from the group consisting of EPDM rubber, nitrile rubber and butyl rubber typically used in an electrical apparatus designed for using SF6. For these sealing materials, also the permeation rate of the alternative insulation medium according to some embodiments of the present invention has been found to be relatively low.

Alternatively or additionally to the fluoronitrile contained in the specific insulation medium defined above, the alternative insulation medium can contain a fluoroketone, more particularly a perfluoroketone.

The term "fluoroketone" as used in this application shall be interpreted broadly and shall encompass both perfluoroketones and hydrofluoroketones, and shall further encompass both saturated compounds and unsaturated compounds, i.e., compounds including double and/or triple bonds between carbon atoms. The at least partially fluorinated alkyl chain of the fluoroketones can be linear or branched, or can form a ring, which optionally is substituted by one or more alkyl groups. In some example embodiments, the fluoroketone is a perfluoroketone. In further example embodiments, the fluoroketone has a branched alkyl chain, in particular an at least partially fluorinated alkyl chain. In still further example embodiments, the fluoroketone is a fully saturated compound.

In some embodiments the organofluorine compound A is a fluoroketone containing exactly five carbon atoms or exactly six carbon atoms or mixtures thereof. Compared to fluoroketones having a greater chain length with more than six carbon atoms, fluoroketones containing five or six carbon atoms have the advantage of a relatively low boiling point. Thus, problems which might go along with liquefaction can be avoided, even when the apparatus is used at low temperatures.

Fluoroketones containing five or more carbon atoms may be used for the further reason that they are generally non-toxic with outstanding margins for human safety. This is in contrast to fluoroketones having less than four carbon atoms, such as hexafluoroacetone (or hexafluoropropanone), which are toxic and very reactive. In particular, fluoroketones containing exactly five carbon atoms and fluoroketones containing exactly six carbon atoms are thermally stable up to 500° C.

In the context of the embodiment in which the organofluorine compound A is a fluoroketone, it is particularly preferred that the fluoroketone has a branched alkyl chain, because its boiling points is lower than the boiling point of the corresponding compound (having a straight alkyl chain).

According to some embodiments, the method comprises the further step of installing a gas density monitor designed for monitoring the density of the alternative insulation medium.

In the context of the present invention, the term "gas density monitor" encompasses any device for monitoring the density of a gas component and in particular covers devices for the direct measurement of the amount of gas molecules per volume as well as devices employing a temperature-compensated pressure sensor.

The necessity for installing a new gas density monitor can occur in the case where the gas density monitor for monitoring SF6 employs a pressure sensor which is triggered at a different threshold pressure than a pressure sensor of a gas density monitor for monitoring the alternative insulation medium. Also, a replacement of the gas density monitor used in the apparatus to be re-established is required if it is based on a comparison with a reference gas different from the alternative insulation medium. Although not mandatory, the installing of the gas density monitor may be carried out after removing at least partially the SF6-containing insulation medium from an insulation space contained in the apparatus and before filling an alternative insulation medium into the insulation space.

With regard to the above embodiment, after installing the gas density monitor and before filling an alternative insulation medium into the insulation space the insulation space is at least partially evacuated.

In some embodiments after removing at least partially the SF6-containing insulation medium from an insulation space contained in the apparatus and before installing the gas density monitor at least a part of one or more adsorbers, absorbers and/or gas filling valves contained in the insulation space are replaced. With regard to the replacing of adsorbers and/or absorbers, this can be achieved by opening a respective port of the apparatus allowing the removal of a respective container containing the adsorber and/or absorber, such as a cup or a sachet, and the placing of a new container containing unconsumed adsorber and/or absorber in the insulation space. With regard to the replacing of the gas filling valves, some embodiments provide that the new gas filling valve has a thread different than the one of the gas filling valve to be replaced. This ensures that the gas feed for filling in the alternative insulation medium can be correctly attributed to the gas filling valve; the risk of maloperation, which might lead to erroneously filling in SF6 instead of the alternative insulation medium, can thus be efficiently mitigated.

Alternatively to the above embodiment, in which the gas density monitor is installed after removing at least partially the SF6-containing insulation medium from an insulation space contained in the apparatus and before filling an alternative insulation medium into the insulation space it is also thinkable to install the gas density monitor after filling an alternative insulation medium into the insulation space) and during operation of the apparatus, e.g., by means of a check valve.

Apart from the method described above, the present invention also relates to an electrical apparatus obtainable by the process.

According to this further aspect, the present invention thus relates to an electrical apparatus of medium or high voltage, which is configured in a manner for using an insulation medium containing SF6, but which is re-established in manner to contain the alternative insulation medium described above, i.e., a mixture of at least one organofluorine compound A and a carrier gas containing nitrogen.

Specifically, the insulating space containing the alternative insulation medium is sealed with a sealing component comprising a sealing material selected from the group consisting of EPDM rubber (ethylene propylene diene monomer rubber), nitrile rubber and butyl rubber.

As mentioned above, the alternative insulation gas has surprisingly been found to be highly compatible with the sealing materials mentioned and to exhibit a low permeation rate through these materials.

Typically, the sealing component sealing the insulation space is in the form of an O-ring. The sealing material used for the sealing component may be EPDM rubber (ethylene propylene diene monomer rubber), but can alternatively also be nitrile rubber and butyl rubber including unmodified butyl rubber and modified butyl rubber, especially chlorobutyl rubber (CIIR) or bromobutyl rubber (BIIR).

Specifically, the apparatus of the present invention, in particular the gas-insulated apparatus, is a switchgear, in particular a gas-insulated switchgear (GIS), or a part and/or a component thereof, a gas-insulated line (GIL), a busbar or a bushing.

According to further embodiment of the invention, the apparatus can also be a cable, a gas-insulated cable, a cable joint, a current transformer, a voltage transformer, a sensor, a humidity sensor, a surge arrester, a capacitor, an inductance, a resistor, an insulator, an air-insulated insulator, a gas-insulated metal-encapsulated insulator, a current limiter, a high voltage switch, an earthing switch, a disconnector, a combined disconnector and earthing switch, a load-break switch, a circuit breaker, a gas circuit breaker, a generator circuit breaker, a gas-insulated vacuum circuit breaker, a medium voltage switch, a ring main unit, a recloser, a sectionalizer, a low voltage switch, and/or any type of gas-insulated switch, transformer, distribution transformer, power transformer, tap changer, transformer bushing, electrical rotating machine, generator, motor, drive, semiconducting device, computing machine, power semiconductor device, power converter, converter station, convertor building, and components and/or combinations of such devices.

The present invention is further illustrated by means of the following working example.

EXAMPLE

A gas-insulated switchgear of the type ELK-3,420 kV (ABB Power Grids Switzerland Ltd.) designed for using SF6 as dielectric insulation medium has been provided and SF6 contained in an insulation space of the apparatus has been removed by means of a vent connected to the housing enclosing the insulation space.

An alternative insulation medium containing 85.5% of nitrogen, 10% of heptafluoroisobutyronitrile and about 4.5% of oxygen has then been filled into the insulation space by means of feed pipe connected to a respective socket in the housing enclosing the insulation space.

The apparatus thus re-established according to the present invention successfully passed dielectric tests according to IEC regarding lightening impulse withstand voltage, switching impulse withstand voltage, power frequency withstand voltage and partial discharge measurement.

The dew point of the mixture was determined by constantly cooling down slowly the fluid and monitoring the respective pressure of the fluid, the drop in the pressure indicating the point where condensation starts. Thereby, a dew point of the mixture at −33° C. was determined, i.e., lower than the dew point of isolated heptafluoroisobutyronitrile at the same partial pressure, which is at −30° C.

The alternative gas mixture was further found to be compatible with all materials used in the installed passive components, namely with the paint, sealings, adsorbers and absorbers used.

Regarding gas tightness, EPDM O-rings used as standard SF6-sealing components in the apparatus have shown an acceptable degree of permeation of the alternative gas mixture used. Specifically, the permeation of nitrogen through the EPDM O-rings were found to be reduced by a factor of 7 compared to the permeation of carbon dioxide.

The invention claimed is:

1. A method for re-establishing an electrical apparatus of medium or high voltage, the method comprising the steps of:

a) providing an electrical apparatus designed for using an insulation medium containing SF6, b) removing at least partially the SF6-containing insulation medium from an insulation space contained in the apparatus, and c) filling an alternative insulation medium into the insulation space, wherein the alternative insulation medium is a mixture of at least one organofluorine compound A and a carrier gas containing nitrogen and carbon dioxide, and the amount of carbon dioxide in the alternative insulation medium is lower than the amount of nitrogen.

2. The method according to claim 1, wherein the organofluorine compound A comprises a fluoroether.

3. The method according to claim 1, wherein the alternative insulation medium contains heptafluoroisobutyronitrile as the organofluorine compound A.

4. The method according to claim 1, wherein after step c), the partial pressure of the organofluorine compound A is at least 5 kPa.

5. The method according to claim 1, wherein the carrier gas amounts to more than 60% of the total gas pressure of the alternative insulation medium.

6. The method according to claim 1, wherein the molar percentage of nitrogen in the alternative insulation medium is higher than 50%.

7. The method according to claim 1, wherein the carrier gas further contains an oxidizing gas.

8. The method according to claim 7, wherein the molar percentage of oxidizing gas in the alternative insulation medium is in a range from 1 to 25%.

9. The method according to claim 1, wherein the molar percentage of carbon dioxide in the alternative insulation n medium is lower than 5%.

10. The method according to claim 1, wherein the molar percentage of the organofluorine compound A contained in the alternative insulation medium is from 0.5% to 35%.

11. The method according to claim 1, wherein the insulation space is sealed by a sealing component comprising a sealing material selected from the group consisting of EPDM rubber, nitrile rubber and butyl rubber.

12. The method according to claim 1, wherein the method comprises the further step of installing a gas density monitor designed for monitoring the density of the alternative insulation medium.

13. The method according to claim 12, wherein the step of installing the gas density monitor is carried out after step b) and before step c).

14. The method according to claim 13, wherein after installing the gas density monitor and before step c) the insulation space is at least partially evacuated.

15. The method according to claim 13, wherein after step b) and before installing the gas density monitor at least a part of one or more adsorbers, absorbers and/or gas filling valves contained in the insulation space are replaced.

16. The method according to claim 12, wherein the step of installing the gas density monitor is carried out during operation of the apparatus by means of a check valve.

17. An electrical apparatus of medium or high voltage re-established by the method according to claim 1.

18. An electrical apparatus according to claim 17, wherein the insulating space containing the alternative insulation medium is sealed with a sealing component comprising a sealing material selected from the group consisting of EPDM rubber, nitrile rubber and butyl rubber.

19. An electrical apparatus according to claim 17, wherein the apparatus is a switchgear, or a part and/or a component thereof, a gas-insulated line (GIL), a busbar or a bushing.

20. An electrical apparatus according to claim 17, wherein the apparatus is a cable, a gas-insulated cable, a cable joint, a current transformer, a voltage transformer, a sensor, a humidity sensor, a surge arrester, a capacitor, an inductance, a resistor, an insulator, an air-insulated insulator, a gas-insulated metal-encapsulated insulator, a current limiter, a high voltage switch, an earthing switch, a disconnector, a combined disconnector and earthing switch, a load-break switch, a circuit breaker, a gas circuit breaker, a generator circuit breaker, a gas-insulated vacuum circuit breaker, a medium voltage switch, a ring main unit, a recloser, a sectionalizer, a low voltage switch, and/or any type of gas-insulated switch, transformer, distribution transformer, power transformer, tap changer, transformer bushing, electrical rotating machine, generator, motor, drive, semiconducting device, computing machine, power semiconductor device, power converter, converter station, convertor building, and components and/or combinations of such devices.

* * * * *